United States Patent [19]

Smith

[11] Patent Number: 5,023,948

[45] Date of Patent: Jun. 11, 1991

[54] POLARIZATION MODULATION OF OPTICAL SIGNALS USING BIREFRINGENT MEDIUM

[75] Inventor: David W. Smith, Woodbridge, England

[73] Assignee: British Telecommunications public limited company, England

[21] Appl. No.: 317,655

[22] Filed: Mar. 1, 1989

Related U.S. Application Data

[62] Division of Ser. No. 14,046, Feb. 18, 1987, Pat. No. 4,831,663.

[30] Foreign Application Priority Data

Jun. 19, 1985 [GB] United Kingdom ............... 8515499

[51] Int. Cl.$^5$ ............................................. H04B 10/04
[52] U.S. Cl. .................................. 455/616; 455/615; 455/617
[58] Field of Search ............... 455/616, 600, 615, 612, 455/617, 618, 619; 370/1, 34, 2

[56] References Cited

U.S. PATENT DOCUMENTS

| | | |
|---|---|---|
| 138,584 | 5/1873 | Royse . |
| 2,288,802 | 7/1942 | Hammond, Jr. . |
| 3,214,590 | 10/1965 | Schachtman . |
| 3,215,840 | 11/1965 | Buhrer ............................ 455/616 |
| 3,284,632 | 11/1966 | Niblack . |
| 3,353,896 | 11/1967 | Blattner . |
| 3,368,861 | 2/1968 | Rubinstein ........................ 455/616 |
| 3,404,353 | 10/1968 | Harris et al. . |
| 3,408,498 | 10/1968 | Ohm . |
| 3,415,995 | 12/1968 | Kerr . |
| 3,428,810 | 2/1969 | Ross ................................... 455/616 |
| 3,457,414 | 7/1969 | Ragen . |
| 3,463,924 | 8/1969 | Culshaw ........................... 455/616 |
| 3,584,221 | 6/1971 | Furukawa . |
| 3,971,930 | 7/1976 | Fitzmaurice et al. ............ 455/616 |
| 4,464,756 | 8/1984 | Tromborg . |

FOREIGN PATENT DOCUMENTS

| | | |
|---|---|---|
| 0138584 | 10/1987 | European Pat. Off. . |
| 0241039 | 10/1987 | European Pat. Off. ............ 455/616 |
| 0010550 | 1/1982 | Japan ................................. 455/616 |
| 2191644 | 12/1987 | United Kingdom ............... 455/616 |

OTHER PUBLICATIONS

Niblack, "Polarization Modulation and Demodulation of Light", Applied Optics, 2-64, vol. 3, No. 2, pp. 277-279.

Primary Examiner—Reinhard J. Eisenzopf
Assistant Examiner—L. Van Beek
Attorney, Agent, or Firm—Nixon & Vanderhye

[57] ABSTRACT

A digital transmission system and method for coherent optical systems in which a source signal is frequency modulated by digital information and caused to be incident on a birefringent medium. Moudulation signals are produced having a polarization which is dependent on the frequency of the source signal. The information can be regenerated by processing only one of the modulation signals and thus only one need be transmitted. Further modulation signals may be transmitted to enable error checking at the receiver.

20 Claims, 3 Drawing Sheets

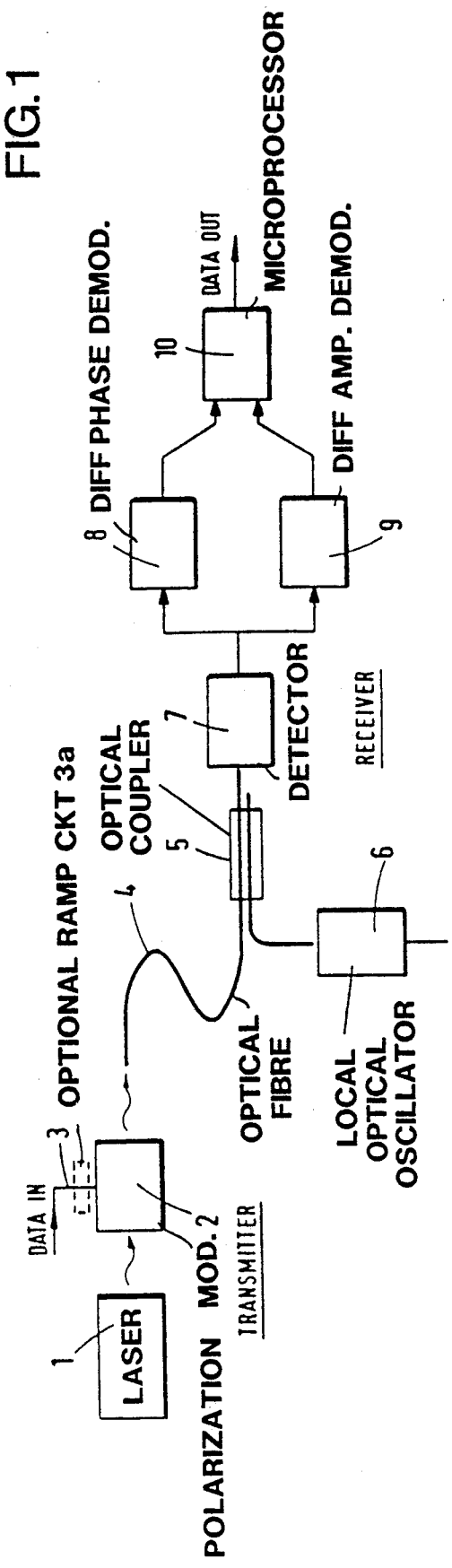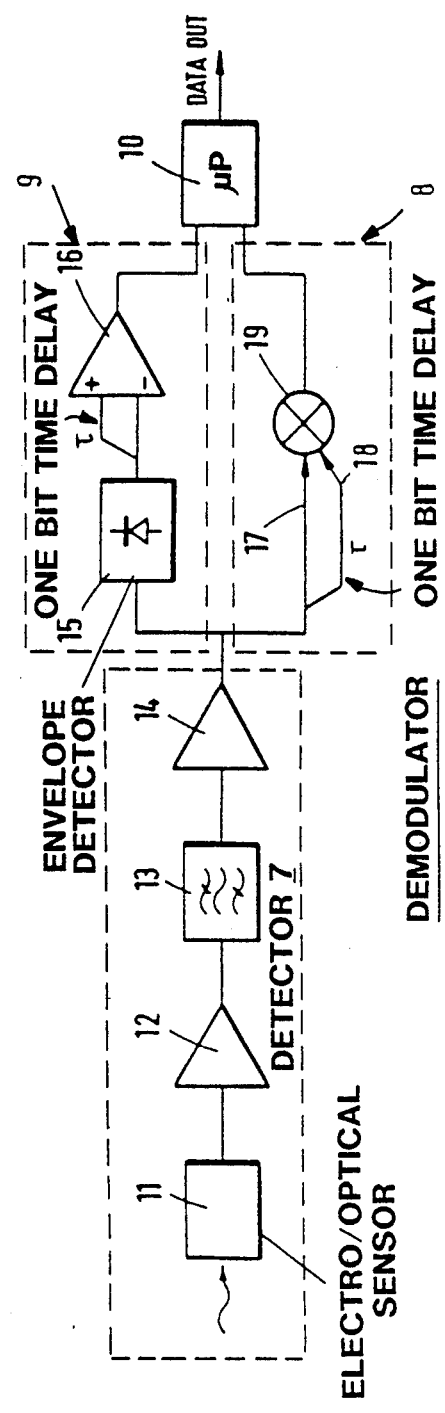

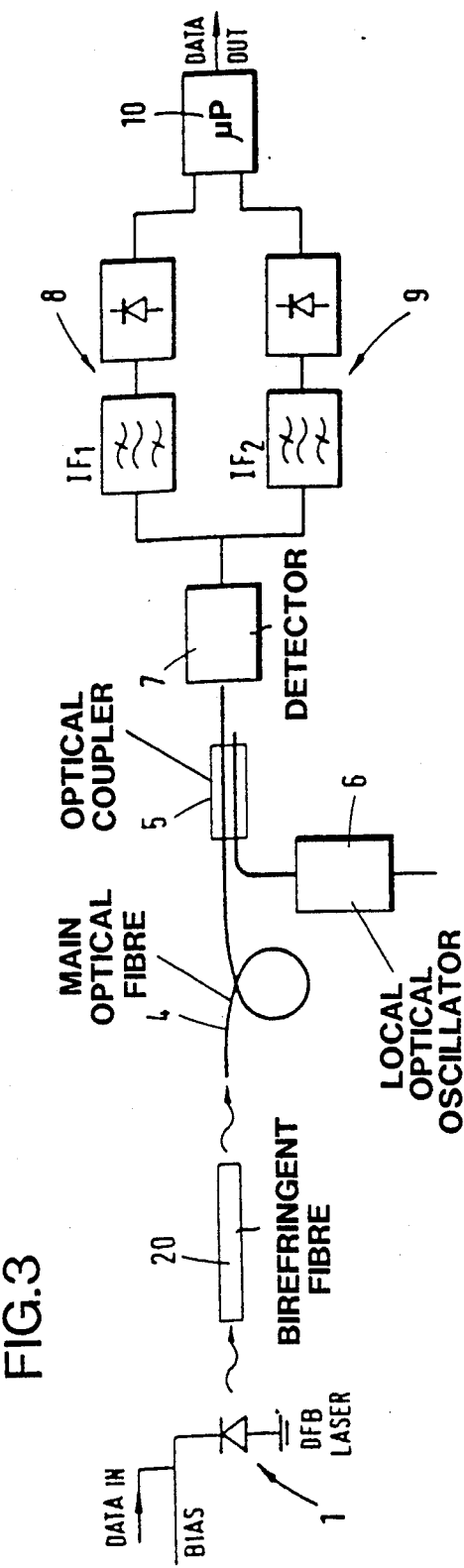
FIG.3
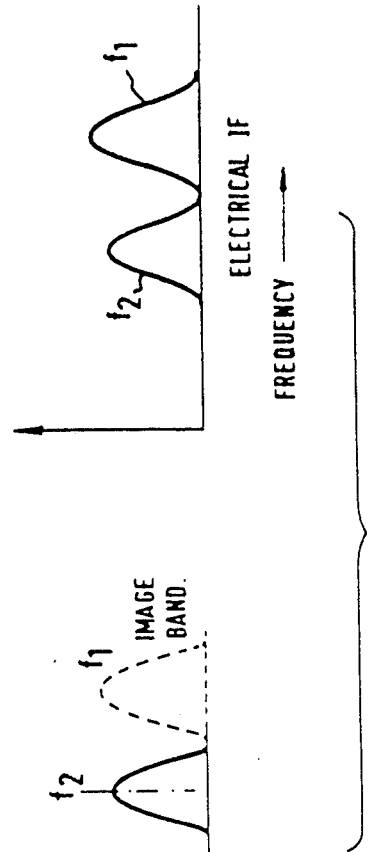
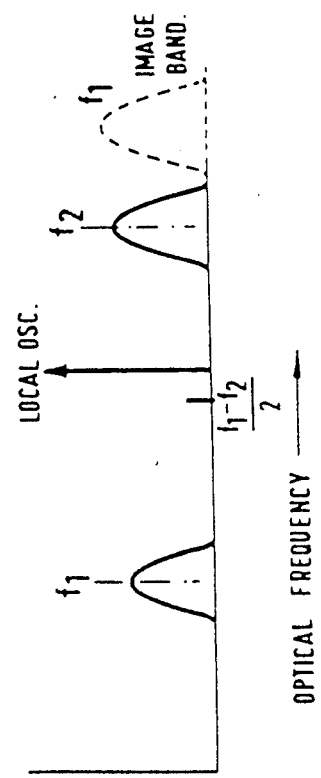
FIG.4

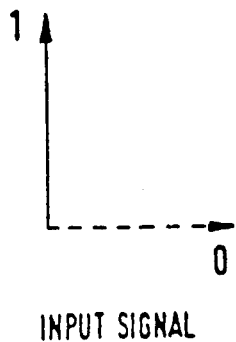
INPUT SIGNAL
LOCAL OSCILLATOR
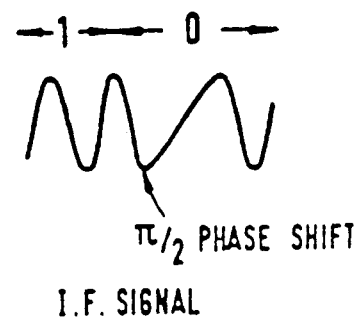
$\pi/2$ PHASE SHIFT
I.F. SIGNAL
FIG.5(a)  FIG.5(b)  FIG.5(c)
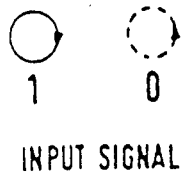
INPUT SIGNAL
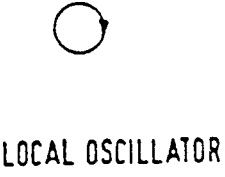
LOCAL OSCILLATOR
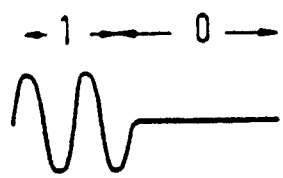
I.F. SIGNAL
FIG.6(a)  FIG.6(b)  FIG.6(c)

POLARIZATION MODULATION OF OPTICAL SIGNALS USING BIREFRINGENT MEDIUM

This is a division of my commonly assigned co-pending U.S. application Ser. No. 07/014,046 filed Feb. 18, 1987 (now U.S. Pat. No. 4,831,663 issued May 16, 1989) based on PCT Application No. PCT/GB86/00354 filed Jun. 18, 1986 and published as WO86/07658 on Dec. 31, 1976.

BACKGROUND OF THE INVENTION

1. Field of the Invention

The invention relates to the transmission of digital information in which electro-magnetic radiation is modulated in accordance with the information.

2. Description of Related Art

Various detection methods have been proposed in the past for demodulating the transmitted radiation including coherent detection and direct detection. Although coherent detection has major advantages over direct detection, it has the drawback of polarization sensitivity. This problem could, in principle, be eliminated if a transmission medium could be developed which was polarization holding.

In the case of optical radiation, special optical fibres have been developed which are substantially polarization holding but these have complex structures and much higher losses (and are more expensive) when compared to standard circular symmetric monomode fibres. Furthermore, since large quantities of standard optical fibre have already been installed, are being installed, and are planned for the telecommunications which initially use polarization insensitive to direct detection, it is desirable to devise a transmission method and system which is compatible with these fibre coherent networks.

So far two schemes have been proposed that will enable coherent detection, to be used with standard fibre; these are active polarization control and polarization diversity. The former is capable of eliminating all polarization penalties. However, an extra opto-mechanical or electro-optic device is required in either the local oscillator or signal path at the receiver. This complicates the receiver and could also result in an insertion loss penalty. Polarization diversity reception eliminates the need for extra optical control devices in the receiver but requires the addition of a polarising beam splitter and a second photodiode, amplifier chain and intermediate frequency (I.F.) demodulator. With polarization diversity reception there can be up to 3 dB receiver sensitivity penalty for certain combinations of input polarization and local oscillator polarization states when the outputs of the two I.F. demodulators are simply combined (although it may be possible to reduce this penalty to about 1 dB with more complex post demodulator processing).

These two methods of overcoming polarization problems both result in a more complex receiver which although possibly acceptable in a long distance high capacity point-to-point transmission link could introduce a significant cost penalty in a local wideband distribution scheme or LAN/MAN type application.

SUMMARY OF THE INVENTION

A method of transmitting digital information comprises generating a polarized electro-magnetic wave; modulating the wave in successive clock periods by causing changes in polarization of the wave in accordance with the information; transmitting the modulated wave; and detecting changes in polarization of the transmitted wave to regenerate the information.

The invention, instead of making use of the absolute polarization of radiation, detects changes in polarization state between adjacent bits at the receiver. The absolute polarization does not matter.

We have realized that although the output state of polarization of a long transmission path using standard optical fibre fluctuates, it does so only slowly. For cable buried under the ground, where the temperature remains fairly stable, significant fluctuations may not occur over several hours.

The polarization modulation could be based on any of the following known effects: Kerr, Faraday rotation or TE to TM conversion.

The detection of the transmitted wave may be achieved in any conventional manner. Preferably, however, the detecting step comprises combining the transmitted modulated wave with a detection signal of fixed polarization to generate a wave with an intermediate frequency, and detecting changes in phase and/or amplitude of the intermediate frequency wave to regenerate the information.

In some examples, the modulation step may comprise switching the polarization of the wave between two values at for example 90°. Alternatively, a change in polarization within a clock period may be achieved by ramping the polarization between two polarizations (i.e., by more gradually changing polarization within a clock period, such as by linearly changing polarization with respect to time over a substantial portion of a clock period thus defining a "ramp" if polarization is plotted versus time).

Although the invention is applicable to electro-magnetic radiation with a variety of wavelengths, it is particularly applicable to wavelengths in the optical domain. In this specification, the term optical is intended to refer to that part of the electro-magnetic spectrum which is generally known as the visible region together with those parts of the infra-red and ultra-violet regions at each end of the visible region which are capable of being transmitted by dielectric optical waveguides such as optical fibres.

It is particularly advantageous if the method further comprises additionally modulating one or more of the phase, amplitude, and frequency of the polarized electro-magnetic wave in accordance with the digital information.

This facility can be used in two ways. Firstly, double the amount of information can be sent on the transmitted wave thus doubling the transmission rate, or alternatively the digital information used to modulate the one or more of the phase, amplitude and frequency of the polarized electro-magnetic wave may be the same information which is used to modulate the polarization of the wave. The latter possibility provides a way of reducing the chances of error in detecting the transmitted information.

In accordance with a second aspect of the present invention, a digital information transmission system comprises a source of polarized electro-magnetic radiation; modulating means responsive to the information for causing in successive clock periods changes in polarization of the radiation in accordance with the information; transmitting means for transmitting the modulated radiation; and detecting means for receiving the transmitted modulated radiation and for detecting changes in polarization of the radiation to regenerate the information.

The source of electro-magnetic radiation may comprise for example a laser.

In one particularly convenient arrangement in which the radiation has a wavelength in the optical domain, the apparatus further comprises a birefringent medium; and means for modulating the frequency of the polarized electro-magnetic radiation in accordance with the information, the frequency modulated radiation being incident on the birefringent medium whereby corresponding changes in polarization of the radiation are caused.

This provides a particularly elegant arrangement which would eliminate the need for an external modulator and thus avoid the losses associated with such a modulator. The output polarization from the birefringent medium, such as a short length of optical fibre, is dependant on the optical frequency of the source and can therefore be modulated as the source frequency is modulated.

We believe that the invention is particularly applicable to overcoming the problem of long term polarization stability in coherent transmission systems using monomode fibre. The invention enables considerable simplification of the detecting means such a heterodyne receiver. This will be of benefit in future wideband distribution schemes. There may also be some scope for using the invention in optical networks that have all optical sources centrally located. In this case it may be possible to provide polarization modulators at remote terminals fed by continuous wave light from a central laser bank.

BRIEF DESCRIPTION OF THE DRAWINGS

Some examples of methods and systems in accordance with the invention will now be described with reference to the accompanying drawings, in which:

FIG. 1 illustrates schematically one example of a transmission system;

FIG. 2 illustrates the receiver of FIG. 1 in more detail;

FIG. 3 illustrates a second example of a transmission system;

FIG. 4 illustrates graphically a detection method; and,

FIGS. 5A-5C and 6A-6C illustrate the waveforms of input signals, local-oscillator signals, and IF signals in two different examples.

DESCRIPTION OF THE PREFERRED EMBODIMENTS

The system shown in FIG. 1 comprises a semiconductor laser 1 which generates a linearly polarized beam of optical radiation. The beam is fed to a polarization modulator 2 of conventional form which is controlled via a data input 3. At successive clock periods, data is applied to the modulator 2 which causes either a change or no change in the polarization of the incoming beam. For example, a binary digit "1" may cause a 90° switch in polarization whereas a binary digit "0" will cause no change. The modulated radiation is then fed into a conventional monomode optical fibre 4 defining a transmission path.

At a receiving station, the optical fibre 4 is connected to an optical coupler 5 having a second input connected to a local oscillator 6 constituted by a semiconductor laser which generates circularly polarized optical radiation. The optical coupler 5 combines the incoming modulated optical signal with the local oscillator signal and the resultant IF signal is fed to a detector 7.

Information is contained in both the differential phase, ie. the change in phase between clock periods, and the differential amplitude of the IF signal, that is the change in amplitude between clock periods.

The relative magnitude of the demodulated phase signal to the demodulated amplitude signal will depend on the relationship of the received state of polarization to that of the local oscillator polarization. For certain combinations of input signal to local oscillator polarization there will be no useful amplitude information. Take, for instance, the case when the input polarization is switching between two linear orthogonal states (FIG. 5A) and the local oscillator is circular (FIG. 5B). With this combination although the IF amplitude will remain constant the IF phase will switch in sympathy with the input signal's polarization (FIG. 5C). In contrast, consider the case, again with a circular local oscillator (FIG. 6B), where the input signal is switching between right circular and left circular (FIG. 6A). This time the IF envelope switches completely (FIG. 6C). Therefore to determine that a polarization change has taken place it is necessary to process both the demodulated differential phase and envelope signals together. To give optimum performance in some cases it may better not to represent symbols by step changes in polarization states but by some other function; for example a polarization ramp ecg., a more gradual polarization change with respect to time via a conventional ramp circuit 3a.

The detector 7 which includes a filter generates an output signal which is fed in parallel to a differential phase demodulator 8 and a differential amplitude demodulator 9 The output signals from these demodulators 8, 9 are fed to a micro-processor 10 which provides an output signal representing the original data. The micro-processor 10 could select between the signals from the phase demodulator 8 and amplitude demodulator 9 the signal with the largest magnitude or it could add the two signals to produce a resultant signal.

FIG. 2 illustrates one way in which the demodulators 8,9 could be implemented. The detector 7 includes a sensor 11 such as a photodiode whose output is fed to an amplifier 12 and then to a filter 13 and a further amplifier 14. The amplitude demodulator 9 is constituted by a conventional envelope detector 15 whose output is split and fed in parallel to the inverting and non-inverting inputs of a differential amplifier 16. The path length to the non-inverting input is longer than that to the inverting input so that a single clock period (or bit period) delay is applied to that bit enabling comparison of signal levels between adjacent bits to take place. In a similar manner the phase change between adjacent clock periods or bits is determined by splitting the path from the amplifier 14 into two 17, 18, delaying one path 18 by a single bit period, and multiplying the two signals in a double balanced modulator 19.

The micro-processor 10 determines what weighting should be given to each of the two demodulated signals. In the simplest case it may be possible to take the signal which has the largest peak-to-peak level.

A second example is illustrated in FIG. 3. In this example the frequency of the optical radiation generated by the semiconductor laser 1 is modulated directly by the digital data. This frequency modulated radiation, of fixed polarization, is fed to a short length of high birefringence fibre 20. Preferably, the frequency modulated beam is launched at $\pi/4$ to the birefringent axis of the fibre 20. The output polarization from this short length of fibre 20 will be dependant on the optical frequency of the source and can therefore be modulated as the laser frequency is modulated. The beam output from the fibre 20 is then coupled to the main optical fibre 4.

Frequency modulation of a semiconductor laser can be achieved directly by control of injection current or by acoustic wave interaction. In the simple case of a laser directly frequency shift keyed betwen $f_1$ and $f_2$ (where the difference between these optical frequencies is much greater then the data rate) it is only necessary to demodulate just one of the two frequencies to determine the symbol transmitted; this single filter detection of FSK gives the same performance as ASK. If it is now arranged that the frequency shift is sufficient for the two signals to have orthogonal polarizations we now have a choice of two signals that could be detected at the distant receiver and either signal containing the transmitted information. The local oscillator frequency at the receiver could be tuned to whichever signal presented the best polarization match.

Moreover, by careful selection of the IF frequency with respect to $f_1-f_2$ it may be possible to site the signal associated with the orthogonal polarization state near the image band of the detected signal. Therefore under this condition where the local oscillator frequency is positioned just off center of $f_1-f_2$ either signal would automatically appear in the receiver IF bandwidth, individually or together depending on the received polarization state. In this case polarization diversity may be possible without retuning the frequency of the receiver local oscillator laser.

What is claimed is:

1. A method of transmitting digital information comprising:
    frequency modulating a polarized electromagnetic signal in response to said information to produce a frequency modulated electromagnetic signal
    causing said frequency modulated electromagnetic signal to be incident on a birefringent medium so as to generate a polarization modulated signal having a polarization which corresponds to the frequency of said frequency modulated electromagnetic signal; and
    transmitting said polarization modulated signal.

2. A method as in claim 1 wherein said frequency modulated signal includes signals at first and second frequencies thereby producing corresponding first and second polarization modulated signals and further comprising detecting said information from at least one of said polarization modulated signals.

3. A method as in claim 2 wherein said detecting step includes determining changes in at least one of said polarization modulated signals to regenerate said information.

4. A method as in claim 3 wherein said information is detected from at least one of said polarization modulated signals.

5. A method as in claim 4 wherein two polarization modulated signals are generated and said method further comprises transmitting and processing said two polarization modulated signals to generate two respective streams of digital data therefrom, and comparing said streams to regenerate said digital information and determine if an error has occurred in the regeneration of said digital information.

6. A method as in claim 5 wherein said frequency modulated electromagnetic signal is caused to be incident on said birefringent medium at $\pi/4$ to the axis of said medium.

7. A method as in claim 6 wherein said detecting step includes causing said two polarization modulated signals to interfere with a polarized local oscillator signal of predetermined frequency so as to generate two respective intermediate frequency signals, both having frequencies which full within an intermediate frequency band of means for performing said detecting step.

8. A method as in claim 1, 2, 3, 4, 5, 6 or 7 further comprising modulating the amplitude and/or phase of said electromagnetic signal in response to digital information.

9. A method as in claim 1, 2, 3, 4, 5, 6, or 7 wherein said frequency modulated electromagnetic and polarization modulated signals are optical signals.

10. A digital information transmission system comprising:
    means for modulating a polarized electromagnetic signal in response to said information to produce a frequency modulated electromagnetic signal at an output thereof;
    means for transmitting a polarization modulated electromagnetic signal including a birefringent medium which is coupled to said output of said means for modulating;
    means for causing said frequency modulated electromagnetic signal to be incident on said birefringent medium so as to generate a polarization modulated signal having a polarization which is dependent on the frequency of said frequency modulated electromagnetic signal.

11. A system as in claim 10 wherein said frequency modulated signal includes at first and second frequencies thereby producing corresponding first and second polarization modulated signals and further comprising means, coupled to said transmitting means, for detecting said information from at least one of said polarization modulated signals.

12. A system as in claim 11 wherein said detecting means detects changes in at least one of said polarization modulated signals to regenerate said information.

13. A system as in claim 11 or 12 wherein said detecting means detects said information from at least one of said polarization modulated signals.

14. A system as in claim 13 wherein two polarization modulated signals are generated in said birefringent medium and said detecting means is adapted to process said two polarization modulated signals to generate two respective streams of digital data therefrom and compare said streams to regenerate said digital information and determine if an error has occurred in the regeneration of said information.

15. A system as in claim 14 wherein said detecting means causes said two polarization modulated signals to interfere with a polarized local oscillator signal of predetermined frequency so as to generate two respective intermediate frequency signals, both having frequencies which fall within an intermediate frequency band of said detecting means.

16. A system as in claim 15 wherein said frequency modulated electromagnetic signal is caused to be incident on said birefringent medium at $\pi/4$ to the axis of said medium.

17. A system as claimed in claim 16 wherein said detecting means includes:

a local source for generating said local signal;

a main detector including electromagnetic to electrical signal conversion means and a filter having said intermediate frequency band;

a coupler for coupling said transmitting means and said local source to said main detector;

subsidiary detectors connected to said main detector which generate said digital data from said modulation signals, respectively; and processing means for generating said digital information in response to receiving said digital data from said subsidiary detectors.

18. A system as in claim 10, 11 or 12 wherein said modulating means is adapted to modulate the amplitude and/or phase of said frequency modulated electromagnetic signal in response to digital information.

19. A system in claim 18 wherein said transmitting means further includes an electromagnetic dielectric waveguide coupled to said birefringent medium.

20. A system as in claim 10, 11 or 12 wherein said frequency modulated electromagnetic and polarization modulated signals are optical signals.

* * * * *